United States Patent [19]

Alanara

[11] Patent Number: 5,794,156
[45] Date of Patent: Aug. 11, 1998

[54] CELLULAR COMMUNICATIONS SYSTEM HAVING ENHANCED PRIORITY ACCESS AND CHANNEL ASSIGNMENT FUNCTIONS

[75] Inventor: Seppo M. Alanara, Oulu, Finland

[73] Assignee: Nokia Mobile Phones Limited, Salo, Finland

[21] Appl. No.: 697,493

[22] Filed: Aug. 26, 1996

[51] Int. Cl.⁶ .......................... H04L 5/16; H04M 11/00; H04Q 7/38
[52] U.S. Cl. .......................... 455/517; 455/455; 455/509; 455/512; 455/528
[58] Field of Search ................................ 455/517, 422, 455/455, 516, 524, 450, 452, 453, 509, 510, 512, 514, 515, 528, 527; 370/412, 416, 428, 429, 329

[56] References Cited

U.S. PATENT DOCUMENTS

| | | | |
|---|---|---|---|
| 5,175,758 | 12/1992 | Levanto et al. | 455/458 |
| 5,257,257 | 10/1993 | Chen | 370/441 |
| 5,287,552 | 2/1994 | Sasuta | 455/528 |
| 5,394,391 | 2/1995 | Chen et al. | 370/441 |
| 5,457,735 | 10/1995 | Erickson | 455/509 |
| 5,553,315 | 9/1996 | Sobti | 455/509 |
| 5,572,546 | 11/1996 | Serfaty | 455/517 |
| 5,581,802 | 12/1996 | Erickson | 455/517 |
| 5,613,213 | 3/1997 | Naddell | 455/517 |
| 5,625,879 | 4/1997 | Tuulos | 455/509 |
| 5,666,364 | 9/1997 | Pierce | 455/512 |
| 5,711,010 | 1/1998 | Naddell | 455/509 |

*Primary Examiner*—Howard Britton
*Attorney, Agent, or Firm*—Perman & Green, LLP

[57] ABSTRACT

A method is disclosed for operating a wireless communications system that includes a BMI (32) that is bidirectionally coupled to a communications network (36) and at least one wireless mobile station (10) that is bidirectionally coupled to the BMI. The method includes the steps of (a) queuing in the BMI a call originated by the mobile station; (b) at a time that a BMI resource, such as a traffic channel, is available for completing the queued call, determining if the call can be completed; and (c) for the case where the call cannot be completed, sending a message to the mobile station for indicating that the queued call cannot be completed. The message is sent before a traffic channel is allocated to the mobile station. In this manner the mobile station can be signalled that the queued number is unavailable, but without first allocating a traffic channel to the mobile station. The method further includes a step, executed during a time that the call is queued, of sending a second message to the mobile station for indicating that an incoming call has been received for the mobile station. The mobile station is responsive to the second message for sending a third message to the BMI, the third message indicating that the BMI is to cancel the queued call so that the mobile station can receive the incoming call. More particularly, the second message can indicate at least one of that (a) the BMI is to leave the queued call pending while not connecting the incoming call to the mobile station, or that (b) the BMI is leave the queued call pending while connecting the mobile station to the incoming call.

22 Claims, 4 Drawing Sheets

CELLULAR COMMUNICATIONS SYSTEM HAVING ENHANCED PRIORITY ACCESS AND CHANNEL ASSIGNMENT FUNCTIONS

FIELD OF THE INVENTION

This invention relates generally to cellular communications systems and, in particular, to a cellular communications system having a capability to queue mobile terminal originated calls for subsequent connection.

BACKGROUND OF THE INVENTION

As modern cellular communications systems have evolved, particularly with the implementation of digital control channels, it has become possible to offer subscribers many service enhancing features. These features may be available to all subscribers, or only to certain subscribers as a value-added feature.

An exemplary modern cellular communications system is based on standards known in the art as IS-136, Rev. A, Feb. 12 1996. This particular standard provides, in addition to the more conventional analog cellular service, a set of digital control channels (DCCH) and digital voice or traffic channels (DTC). The standard employs time division multiple access (TDMA) techniques that use a slotted frame structure organized as superframes and hyperframes.

One feature of this standard is referred to as Priority Access and Channel Assignment (PACA), which enables a subscriber to originate a queued call when all voice channels are in use. That is, if the subscriber originates a call, but the call cannot be completed because there is currently no free traffic channel to assign to the subscriber, the call is placed into a queue that is maintained by a Base Station, Mobile Switching Center (MSC) and Internetworking Function, typically abbreviated as BMI. When a traffic channel becomes available for use the BMI retrieves a queued call, completes the call, and, while so doing, sends a signal to the subscriber's mobile station or terminal that the previously queued call is being completed.

FIG. 3 illustrates a prior art proposal for implementing PACA, in particular the call completion aspect thereof. Reference in this regard can be had to a document entitled "Stage 2 Description for PACA", Telecomms. Industry Association 800/1800 MHz Cellular Standards TDMA Standards Sub-committee, TR45.3/95.11.14.04 (Oct. 16, 1995).

In general, when PACA is implemented for a given subscriber the subscriber is given priority access to voice and traffic channels by queuing the subscriber's originating calls when channels are not available. When a channel becomes available, the subscriber is served on a first come first served and a priority basis. The subscriber is assigned one of n priority levels at subscription time. Priority levels are defined as 1, 2, 3, . . . , n, with 1 being the highest priority level and n the lowest. The invocation of PACA can be permanent or on demand. PACA service is requested by using a predetermined feature code with an origination request. A subscriber is considered to be busy while waiting for a PACA channel to be assigned.

Referring again to FIG. 3, at step 1 a page message is sent to the mobile station on a control channel (with a distinctive alert message). At step 2 the mobile station sends a page response. At step 3 the serving MSC sends the mobile station a traffic channel (TCH) allocation. At step 4 (optional), the mobile station sends a TCH allocation acknowledgement (ACK) message. At step 5 the mobile station re-tunes to the allocated traffic channel, starts TCH transmission, and alerts the user. At step 6 the user answers the call, and the mobile station sends a message to the system that the user has answered. If the user does not answer in a predetermined time, the call is terminated by the technique that is normally used for unanswered terminations. At step 7, and assuming that the user has answered, the system sends an origination message to an external network. At step 8 the user monitors the progress of call set-up, and the call proceeds as a normal origination.

It may be appreciated that if for some reason the call origination at step 7 cannot be completed, e.g., the called number is busy, then the traffic channel allocation to the mobile station at step 3 has unnecessarily tied up a voice or traffic channel that could have been used for another subscriber. In that traffic channels are an important and valuable resource in a cellular communications system, it is an important goal to make the most efficient use of the traffic channels. However, the currently proposed PACA implementation, as evidenced by the interaction illustrated in FIG. 3, does not make the most efficient use of traffic channels.

OBJECTS OF THE INVENTION

It is thus a first object of this invention to provide an improved method for managing and placing queued calls in a wireless telecommunications system.

It is a further object of this invention to provide a cellular telecommunications system that makes efficient use of traffic channels while managing and placing queued calls.

SUMMARY OF THE INVENTION

The foregoing and other problems are overcome and the objects of the invention are realized by methods and apparatus in accordance with embodiments of this invention. A method of this invention is disclosed for operating a wireless communications system that includes a BMI that is bidirectionally coupled to a communications network and at least one wireless mobile station that is bidirectionally coupled to the BMI. The method comprises the steps of (a) queuing in the BMI a call originated by the mobile station; (b) at a time that a BMI resource is available for completing the queued call, determining if the call can be completed; and (c) for a case where the call cannot be completed, sending a message to the mobile station for indicating that the queued call cannot be completed. The message is sent before a traffic channel is allocated to the mobile station. In this manner the mobile station can be signalled that the queued number is not available, but without first allocating a traffic channel to the mobile station.

The method further includes a step, executed during a time that the call is queued, of sending a second message to the mobile station for indicating that an incoming call has been received for the mobile station. This second message may also contain the calling number ID which can then be displayed to the mobile station user. Alternatively, a page message can be sent to the mobile station. In the first instance of sending the second message, the mobile station is able to refuse the incoming call while waiting for the PACA call.

In this embodiment of the invention the base station merely informs the mobile station of the presence of an incoming call, although there is no available voice channel to assign to the incoming call. As such, the mobile station user is able to select based on some criterion, such as the incoming caller number, whether the mobile station user desires to take the incoming call, or to maintain the queued, originated call, when a voice channel becomes available.

In a further embodiment the mobile station receives the incoming call (when a traffic channel becomes available), while the mobile-originated PACA call is maintained pending on the voice channel queue.

In this embodiment the mobile station is responsive to the second message for sending a third message to the BMI, the third message indicating that the BMI is to cancel the queued call so that the mobile station can receive the incoming call. More particularly, the third message can indicate at least one of that (a) the BMI is to leave the queued call pending while not connecting the incoming call to the mobile station, or that (b) the BMI is to leave the queued call pending while connecting the mobile station to the incoming call if a voice channel becomes available after a reasonable time period (i.e., reasonable for the caller at the other end).

For a case where the queued call cannot be completed, the method further comprises a mobile station executed step of alerting the user for indicating that an unsuccessful attempt was made to complete the queued call. The alerting can use a special tone, either alone or in combination with a message that is displayed to a user, and/or a mobile station generated busy tone that is audible to the user.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
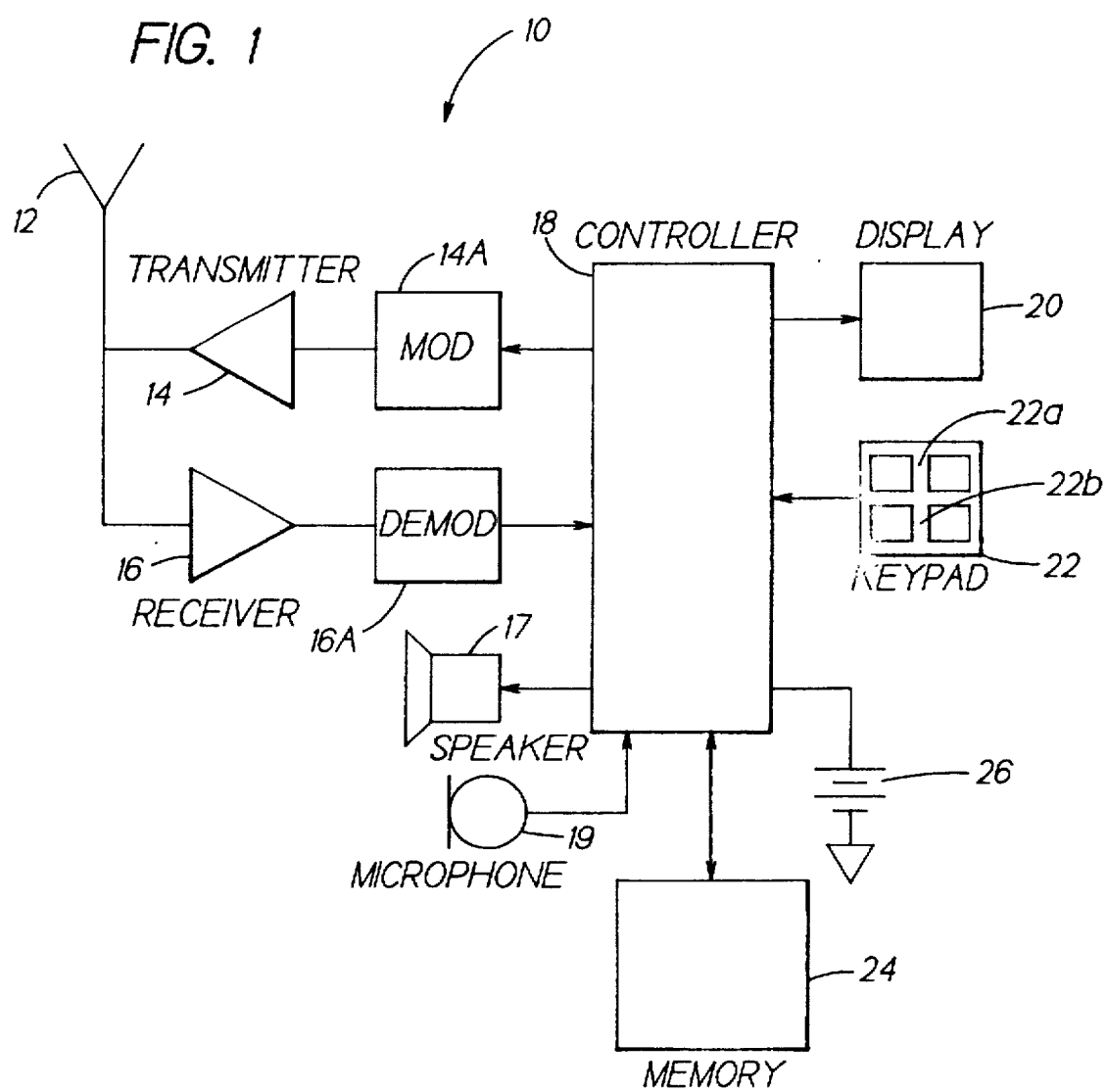
FIG. 1 is a block diagram of a mobile terminal that is constructed and operated in accordance with this invention.
Figure 2:
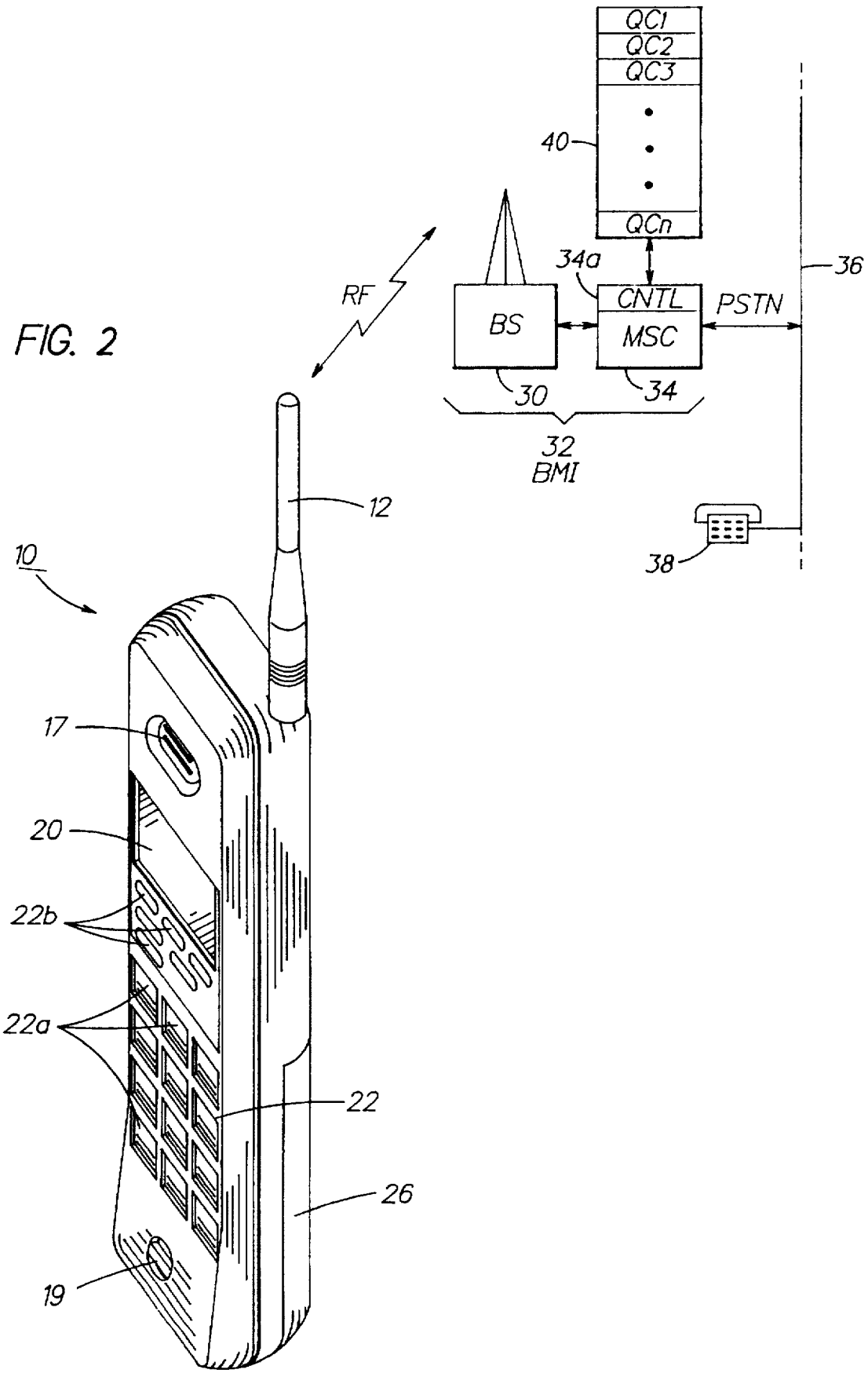
FIG. 2 is an elevational view of the mobile terminal shown in FIG. 1, and which further illustrates a cellular communication system to which the mobile terminal is bidirectionally coupled through wireless RF links.
Figure 3:
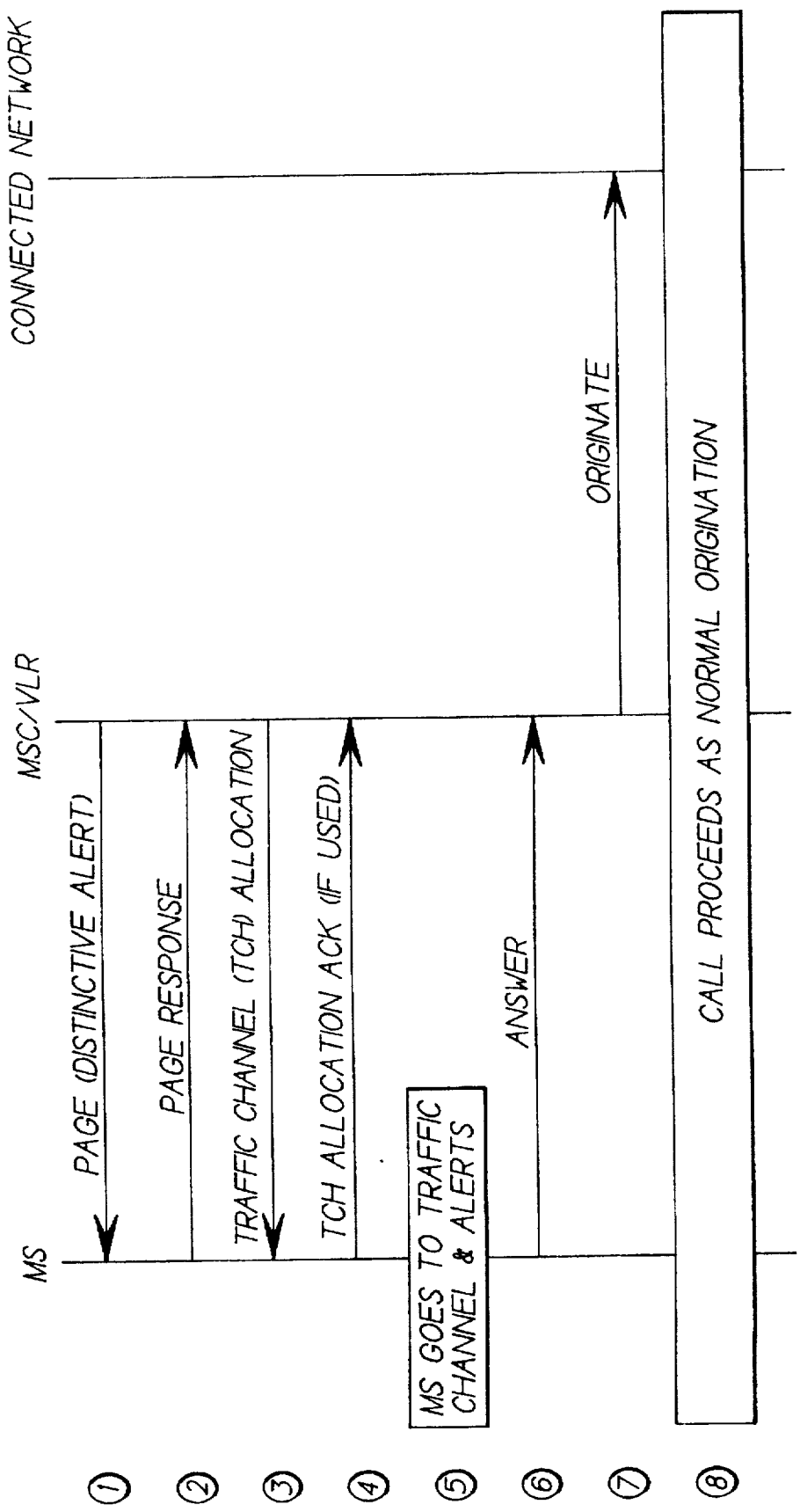
FIG. 3 is a diagram that illustrates a conventional call completion interaction between a mobile station (MS), Mobile Switching Center/Visitor Location Register (MSC/VLR), and a connected network.

Reference is made to FIGS. 1 and 2 for illustrating a wireless user terminal or mobile station 10, such as but not limited to a cellular radiotelephone, that is suitable for practicing this invention. The mobile station 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile station 10 is registered with the network, such as the public switched telephone network (PSTN) 36 and/or private and residential networks. In FIG. 2 the PSTN 36 is assumed to be connected to telephones 38 that can be called from the mobile station 10.

For the purposes of this invention the BMI 32 is assumed to include a queue 40 wherein are stored telephone numbers, and related information, which are originated by PACA-subscribing mobile stations 10. Each mobile station may have one or more pending calls in the queue 40. The queue 40 has 1–n locations (e.g., 15 entries) for storing up to n queued calls (QC), and is shown for convenience as being connected to the MSC 34. In the case of multiple pending calls, the BMI 32 connects the first call which does not have a busy status.

The mobile station 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a PACA or PACA-like feature of a type that was described above, and that is further augmented, as described below, in accordance with this invention. It should be noted, however, that the teaching of this invention is not intended to be limited for use only with an IS-136 compatible mobile station, or for use only in TDMA type systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The mobile station 10 also includes a battery 26 for powering the various circuits that are required to operate the station.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of standards, such as the above-mentioned IS-136.1, or with GSM, or EIA/TIA 627, or IS-95 (CDMA). Narrow-band AMPS (NAMPS), as well as TACS, mobile stations may also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the method described below in relation to FIG. 4. It is also assumed that a controller in the BMI 32, such as a controller (CNTL) 34a in the MSC 34, is also operable for implementing the BMI portion of the method of this invention.

The teaching of this invention will be described in the context of the IS-136 standard, and reference can be had to the following sections for describing various features of IS-136 (Rev. A, Feb. 12, 1996) that relate either directly or indirectly to PACA: section 6.2.3 DCCH Camping State; section 6.2.5 Origination Proceeding; section 6.2.6 Waiting for Order; section 6.3.4 Termination; section 6.3.5 Origination; section 6.3.10 Registration Success; section 6.3.11 Registration Reject Procedure; section 6.4.3.24 Queue Disconnect Ack; section 6.4.3.25 Queue Update; and section 6.4.4.19 Queue Disconnect. In a presently preferred embodiment of this invention the enhanced PACA technique is implemented by modifying the protocol described in section 6.4.3.25. Queue Update, as described below.

Figure 4:
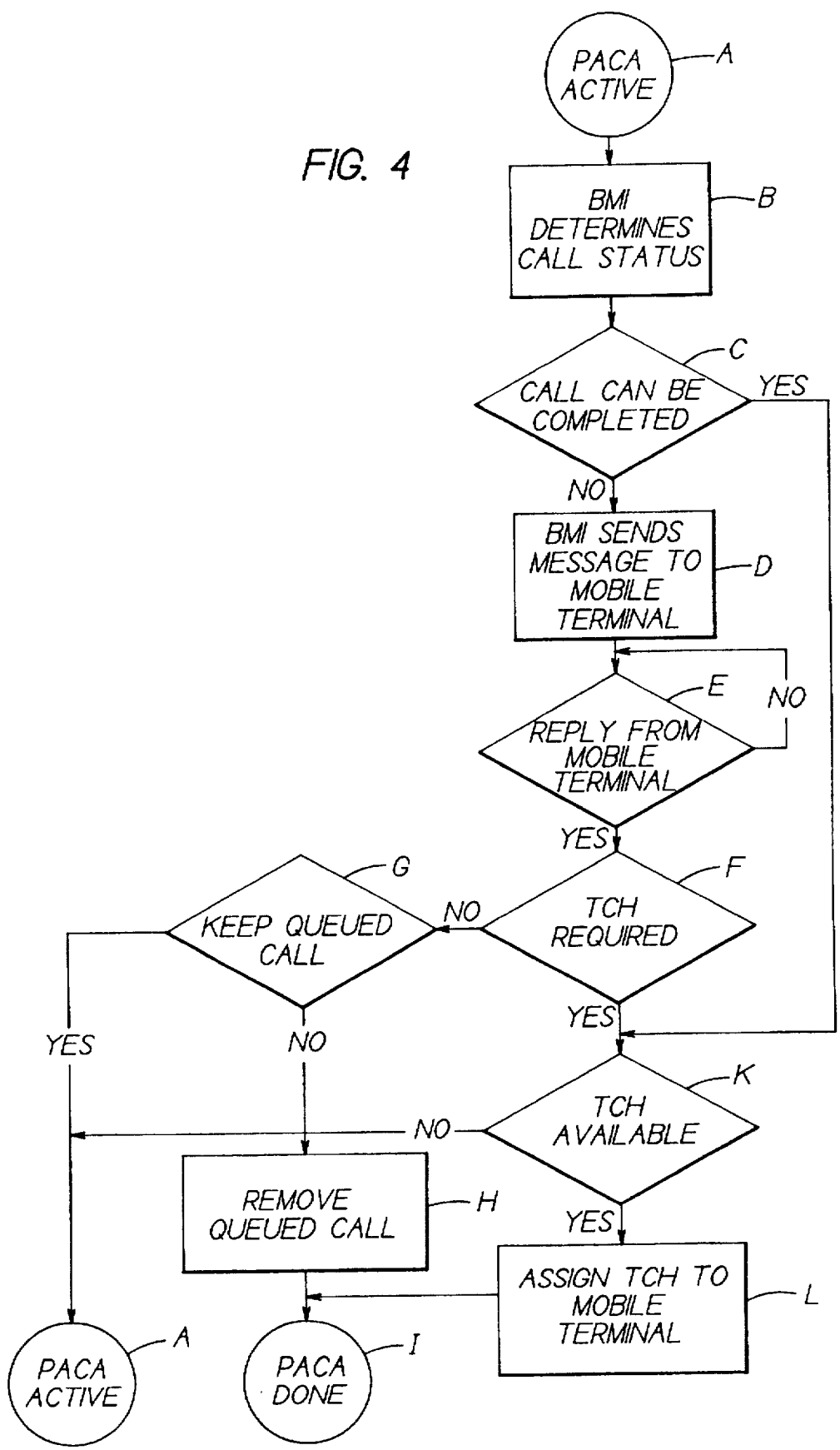
FIG. 4 is a logic flow diagram that illustrates an improved call queuing interaction between the mobile station, the BMI, and a connected network in accordance with this invention.

Reference is now made to FIG. 4 for illustrating a presently preferred, but not limiting, embodiment of this invention.

At Block A the PACA feature is considered to be active for a given one of the mobile stations 10. At Block B the BMI 32 determines the call status for a queued call. The status can be determined periodically or triggered by a change in status of the target telephone. At Block C a determination is made if the call can be completed. That is, if the status change enables the phone call to be completed. For example, if the line is busy but a call waiting feature allows the phone to be notified, then the call is made possible. It should be noted that in a regular voice call the call waiting is indicated by an audio tone, whereas in the case of PACA this is not avaialble. A following information message (Block D) is sent to the mobile station only if the call is not possible (Line busy or network congested). In this case the caller makes a decision as to whether to cancel PACA or set the BMI 32 until the target telephone is reachable. As such, if No at Block C the BMI 32 sends a message to the mobile station 10 (Block D). This message contains line status information for the mobile station. Based on the line status the BMI 32 may automatically choose to cancel the PACA, or the user may be allowed to set the BMI 32 into a monitoring mode for the target line. When the target line is available, the system automatically resumes the PACA or automatically activates the waiting call. At Block E is illustrated a loop wherein the BMI 32 waits for a response to the message sent at Block E. In this response, the mobile station 10 may choose either to cancel PACA or request the BMI 32 to monitor the target line. This response is only required if the user can actually choose one of the two following responses. The first response is to accept an incoming call in the event there is a vacant voice/traffic channel available. The system may be implemented such that the availability of a voice/traffic channel triggers the target line check by the BMI 32. Also, in some embodiments the BMI 32 may optionally continuously scan the target number for availability. In the second response the user cancels the PACA service because, for example, the user anticipates that the busy status will last too long. If the user of the mobile station 10 chooses not to cancel the PACA, the BMI 32 starts to monitor the target line and once it is reachable, the regular PACA is resumed (i.e., the user is put back into the PACA queue).

As such, at Block F a determination is made if a traffic channel (TCH) is required. If No, a determination is made at Block G if the call is to remain queued. If No, control passes to Block H where the call is removed from the queue, and then at Block I the PACA is completed for this user. If Yes at Block G, control passes back to Block A to maintain the PACA active for this user.

If Yes at Block F, or if Yes at Block C, control passes to Block K where a determination is made if a traffic channel is available. If No, control passes to Block A to maintain the PACA active for this user. If Yes at Block K, control passes to Block L where the BMI 32 assigns the available traffic channel to the mobile station 10, thereby completing the queued call. Control then passes to Block I to terminate the PACA for this call.

Referring again to Block D, in a presently preferred embodiment of this invention the message is sent on a forward signalling channel, specifically the SMS Point-to-Point, Paging and Access Response Channel (SPACH) (IS-136.1, sections 2.3.2 and 6.4.3). More particularly, the message is sent from the BMI 32 to the mobile station 10 on the Access Response Channel (ARCH) subchannel using the Queue Update message (IS-136.1, section 6.4.3.25). The Queue Update message is currently specified to be used to inform the mobile station 10 that its originated call attempt has been queued by the BMI, or to provide a currently queued mobile station with updated queue information (i.e., queue position, such as first in queue, second in queue, ... , 15th in queue).

In accordance with an aspect of this invention the Queue Update message is modified to include a Line Status parameter field which is coded as follows:

| VALUE | | FUNCTION |
|---|---|---|
| 0000 | | Line Ready |
| XXX1 | | Line Busy/Reorder/Intercept |
| XX1X | | Call Waiting: |
| | XX10 | Line Ready/Call Waiting |
| | XX11 | Line Busy/Call Waiting |
| 01XX-11XX | | Reserved |

At Block E the BMI 32 waits for a response to the Queue Update message if one is expected (one response may be a Queue Disconnect message which is sent by the mobile station 10 to request that its queued call attempt be disconnected), otherwise at Block F the BMI 32 makes a determination if a traffic channel needs to be assigned. That is, if the Line Status shows that line is ready (i.e., the call to the queued number indicates that the called phone is not busy) or that an incoming call is waiting for the mobile station 10, then at Block K a determination is made if a traffic channel is available and, if so, the channel is assigned at Block L. If No at Block F (a traffic channel is not required, for example the Line Status field indicates that the line was busy) the BMI 32 determines at Block G if the queued call should be maintained. For example, after one or some larger predetermined number of queued call attempts the BMI 32 may automatically remove the queued call, or the mobile station may have indicated that the queued call should be disconnected. If the queued call is not to be retained the call is removed from the queue 40 at Block H, and the PACA procedure terminates.

It can be appreciated that the method illustrated in FIG. 4 does not unnecessarily assign a traffic channel to the mobile station 10 for the case where the called number is busy or otherwise unobtainable.

Furthermore, the user can be alerted by the mobile station 10 in response to the receipt of the Queue Update message on the SPACH, and the user can be informed that the queued call has been attempted but cannot be completed. This can be achieved by a special alerting tone and the display of a suitable message to the user on the display 20. This can also be achieved by a special alerting tone either alone or in combination with the generation of a busy tone by the mobile station 10. In this latter case the user is alerted that the previously queued call has been placed, and then hears a busy tone, all without a traffic channel ever having been assigned to the mobile station 10.

It will be remembered that the mobile station 10 is considered to be busy while a call is queued in the queue 40.

That is, an incoming caller to the mobile station 10 will receive a busy tone. This is to insure that the mobile station 10 will be available to take the queued call when a traffic channel becomes available.

In accordance with a further aspect of this invention the above-described Line Status field can be used to inform the mobile station 10, when it has a currently queued call, that an incoming call has been received. This can occur under three different circumstances.

In a first circumstance the queued call has not yet been attempted (e.g., a traffic channel is not yet available). In this case the BMI 32 detects an incoming call to the mobile station 10 and sends the Queue Update message with the Line Status field set to XX1X (Call Waiting). In response, the mobile station 10 is enabled to send a Queue Disconnect message (IS-136.1, section 6.4.4.19) on the Reverse Access Control Channel (RACH). This message causes the queued call to be disconnected, thereby removing the mobile station's busy status and enabling the mobile station 10 to accept the incoming call. The Queue Disconnect message may be sent automatically (e.g., by the user programming the mobile station 10 to always cancel a queued call when an incoming call is received), or on a call-by-call basis by alerting the user to the incoming call, with a special alerting tone and/or a displayed message, and then waiting for the user to decide whether to accept the incoming call. If the user decides to accept the incoming call, which can be indicated by depressing a specified one of the keys 22a, then the mobile station 10 composes and transmits the Queue Disconnect message to the BMI 32.

The voice announcement or line busy or queue tone indication could be used to inform the wireline caller that the line is "busy", if the user prefers to wait to be assigned an available channel for the originated call. In case the mobile station originated target line is busy, the BMI 32 automatically prefer the incoming mobile terminated call, which is sent to the queue 40 instead of the previous call attempted by the mobile station user. In case the mobile station terminated call is activated, the mobile station originated call could be sent to the queue 40 until the mobile station terminated call has been completed. This queue management is performed automatically by the BMI 32. If the original call is waiting in the queue 40, and one or more additional voice channels becomes available, the cellular switch preferably delays the mobile station originated call until the mobile station terminated call has been completed, and thus the mobile station 10 is again capable of handling the delayed call.

In a second circumstance the queued call has been attempted and the called line is found to available when the incoming call is received. In this case the BMI 32 sends the Queue Update message with the Line Status field set to XX10 (Line Ready/Call Waiting). In response, the mobile station 10 is enabled to send the Queue Disconnect message which causes the queued call to be disconnected, thereby removing the mobile station's busy status and enabling the mobile station to accept the incoming call. Alternately, the mobile station 10 can ignore the incoming call (which is signalled to the caller as the mobile station 10 being busy) and take the queued call.

In a third circumstance the queued call has been attempted and the called line is found to be unavailable (e.g., busy) when the incoming call is received. In this case the BMI 32 sends the Queue Update message with the Line Status field set to XX11 (Line Busy/Call Waiting). In response, the mobile station 10 may send the Queue Disconnect message which causes the queued call to be disconnected, thereby removing the mobile station's busy status and enabling the mobile station 10 to accept the incoming call. Alternately, the mobile station 10 can ignore the incoming call (which is again signalled to the caller as the mobile station 10 being busy) and thereby leave the queued call pending in the queue 40.

In all of these various cases it is within the scope of the invention to display to the user the telephone number from which the incoming call has been made (and/or to display a preprogrammed alphanumeric string identifying the number) to aid the user in determining whether to accept or reject the incoming call.

Although described above in the context of modifications made to the Queue Update message to facilitate the additional signalling from the BMI 32 to the mobile station 10, it is also within the scope of this invention to modify the Queue Disconnect message to facilitate the signalling between the mobile station 10 and the BMI 32. For example, the Queue Disconnect message can be modified to include a field for specifying the following:

| VALUE | FUNCTION |
| --- | --- |
| 0000 | Disconnect Queued Call |
| 0001 | Accept Incoming Call, Leave Queued Call Pending |
| 0010 | Accept Incoming Call, Disconnect Queued Call |
| 0011–1111 | Reserved |

It is also within the scope of this invention, if a traffic channel is available, to send the call waiting indication on a paging channel.

Although described above primarily in the context of allocating a digital voice channel to the mobile station 10, it should be realized that the mobile station 10 may have requested and be waiting for a free data packet channel. As such, the term "traffic channel" should be read to encompass both voice and data channels.

It should further be realized that although this invention has been described in the context of preferred embodiments, a number of modifications to these teachings may occur to those skilled in the art. By example, the various message fields could be encoded differently, or separate messages could be defined for conveying each of the various signalling conditions between the BMI 32 and the mobile station 10 (e.g., five separate types of Queue Update messages and/or three separate types of Queue Disconnect messages could be defined for use).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating wireless communications system comprised of a BMI that is bidirectionally coupled to a communications network and at least one wireless mobile station that is bidirectionally coupled to the BMI, comprising the steps of:

queuing in the BMI a call originated by the mobile station;
    at a time that a BMI resource is available for completing the queued call, determining if the call can be completed; and
    if the call cannot be completed, sending a message to the mobile station for indicating that the call cannot be completed, the message being sent before a traffic channel is allocated to the mobile station.

2. A method as set forth in claim 1, and during a time that the call is queued, sending a second message to the mobile station for indicating that an incoming call has been received for the mobile station.

3. A method as set forth in claim 2, wherein the mobile station is responsive to the second message for sending a third message to the BMI, the third message indicating that the BMI is to cancel the queued call so that the mobile station can receive the incoming call.

4. A method as set forth in claim 1, wherein the message further indicates that an incoming call has been received for the mobile station.

5. A method as set forth in claim 4, wherein the mobile station is responsive to the message for sending a second message to the BMI, the second message indicating at least one of that (a) the BMI is to leave the queued call pending while not connecting the incoming call to the mobile station, or that (b) the BMI is leave the queued call pending while connecting the mobile station to the incoming call.

6. A method as set forth in claim 1, wherein for a case where the queued call can be completed, the method further comprises steps of assigning a traffic channel to the mobile station; and connecting the mobile station to a party called by the queued call.

7. A method as set forth in claim 1, wherein for the case where the queued call cannot be completed, the method further comprises a mobile station executed step of alerting the user for indicating that an unsuccessful attempt was made to complete the queued call.

8. A method as set forth in claim 1, wherein for the case where the queued call cannot be completed, the method further comprises the mobile station executed steps of alerting the user; and generating a busy tone in the mobile terminal.

9. A wireless communications system comprised of a BMI that is bidirectionally coupled to a communications network and at least one wireless mobile station that is bidirectionally coupled to the BMI, said system further comprising:

means in said BMI for queuing a call originated by said mobile station;

means in said BMI, responsive to a time that a BMI resource is available for completing the queued call, for determining if the call can be completed; and means, responsive to a condition that the queued call cannot be completed, for sending a message to said mobile station for indicating that the queued call cannot be completed, the message being sent before a traffic channel is allocated to said mobile station by said BMI.

10. A system as set forth in claim 9, wherein said sending means is further responsive during a time that the call is queued, for sending a second message to said mobile station for indicating that an incoming call has been received at said BMI for said mobile station.

11. A system as set forth in claim 10, wherein said mobile station is comprised of means, responsive to the second message, for sending a third message to said BMI, the third message indicating that said BMI is to cancel the queued call so that said mobile station can receive the incoming call.

12. A system as set forth in claim 9, wherein the message further indicates that an incoming call has been received at said BMI for said mobile station.

13. A system as set forth in claim 12, wherein said mobile station is responsive to said message for sending a further message to said BMI, the further message indicating at least one of that (a) said BMI is to leave said queued call pending while not connecting said incoming call to said mobile station, or that (b) said BMI is leave said queued call pending while connecting said mobile station to said incoming call.

14. A system as set forth in claim 9, wherein for a case where the queued call can be completed, said BMI assigns a traffic channel to said mobile station and connects said mobile station to a party called by the queued call.

15. A system as set forth in claim 9, wherein said mobile station is further comprised of means, responsive to a case where the queued call cannot be completed, for alerting a user for indicating that an unsuccessful attempt was made to complete the queued call.

16. A system as set forth in claim 9, wherein said mobile station is further comprised of means, responsive to a case where the queued call cannot be completed, for alerting a user and for generating a busy tone.

17. A method for operating a wireless communications system comprised of a network controller that is bidirectionally coupled to a communications network and at least one wireless mobile station that is bidirectionally coupled to the network controller, comprising the steps of:

at a time when a traffic channel is not available for completing a call originated by a mobile station, queuing the call originated by the mobile station in the network controller;

sending a first message to the mobile station for indicating that the call was queued;

at a time that a traffic channel becomes available, making a determination at the network controller if the queued call can be completed; and in response to determining that the queued call cannot be completed, sending a second message to the mobile station for indicating that the queued call cannot be completed, the second message being sent without the network controller allocating a traffic channel to the mobile station.

18. A method as set forth in claim 17, and in response to a call being received at the network controller for the mobile station while the call is queued, sending a further message to the mobile station for indicating that an incoming call has been received for the mobile station.

19. A method as set forth in claim 18, wherein the mobile station is responsive to the further message for sending another message to the network controller for indicating at least one of that (a) the network controller is to leave the queued call pending while not connecting the incoming call to the mobile station or that (b) the network controller is leave the queued call pending while connecting the mobile station to the incoming call.

20. A method as set forth in claim 17, wherein the mobile station is responsive to the receipt of the second message for alerting the user and for generating a busy tone in the mobile terminal.

21. A method as set forth in claim 17, wherein the step of making a determination is executed automatically in response to a traffic channel becoming available.

22. A method for operating a wireless communications system comprised of a network controller that is bidirectionally coupled to a communications network and at least one wireless mobile station that is bidirectionally coupled to the network controller, the network controller being operable, at a time when a traffic channel is not available for completing a call originated by a mobile station, for queuing the call originated by the mobile station in the network controller and for placing the mobile station in a busy condition, the network controller further being operable for receiving a call for the mobile station during the time that the mobile station is in the busy condition, comprising the steps of:

sending a Queue Update message from the network controller to the mobile station on a forward signalling channel without first allocating a traffic channel to the mobile station, the Queue Update message comprising Line Status information for specifying to the mobile station one of (a) that an attempt to complete a queued call has been successful, (b) that an attempt to complete the queued call has been unsuccessful, (c) that an incoming call has been received for the mobile station, (d) that an attempt to complete the queued call has been successful and that an incoming call has been received for the mobile station, (e) or that an attempt to complete the queued call has been unsuccessful and that an incoming call has been received for the mobile station; and sending a response message from the mobile station to the network controller on a reverse signalling channel, the response message comprising information for specifying to the network controller one of (a) that the network controller is to remove the queued call from the queue, (b) that the network controller is to connect the incoming call to the mobile station while leaving the queued call in the queue, (c) or that the network controller is to connect the incoming call to the mobile station while removing the queued call from the queue.

* * * * *